UNITED STATES PATENT OFFICE.

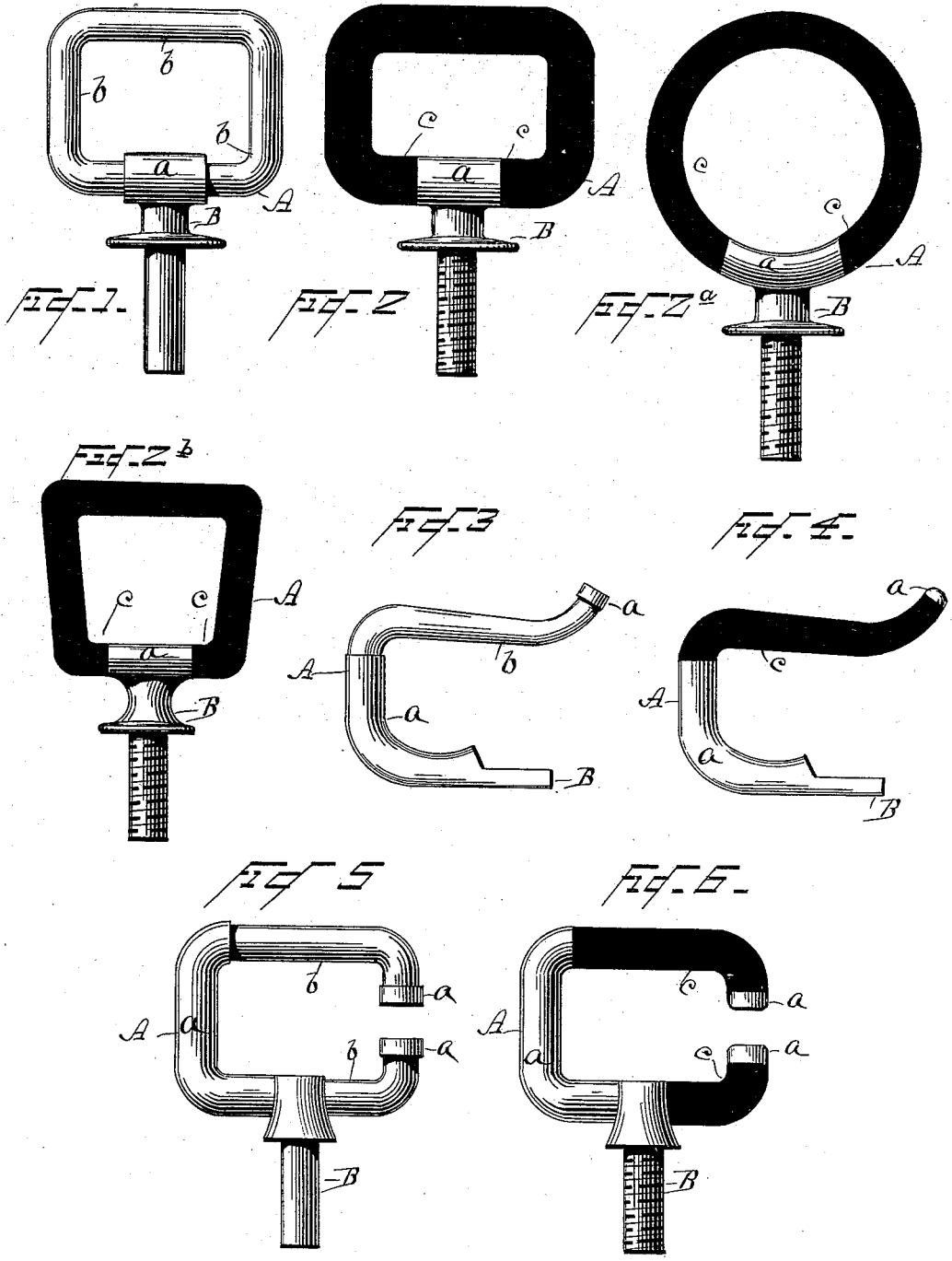

ROBERT S. GRUMMON, OF NEWARK, NEW JERSEY, ASSIGNOR TO THE SARGEANT MANUFACTURING COMPANY, OF SAME PLACE.

MANUFACTURE OF HARNESS-MOUNTINGS.

SPECIFICATION forming part of Letters Patent No. 384,571, dated June 12, 1888.

Application filed March 24, 1888. Serial No. 268,331. (No model.)

*To all whom it may concern:*

Be it known that I, ROBERT S. GRUMMON, a citizen of the United States, residing in Newark, in the county of Essex and State of New Jersey, have invented an Improvement in the Manufacture of Harness-Mountings; and I do hereby declare that the following is a full and exact description of the same, reference being had to the accompanying drawings, making part of this specification.

My invention consists in the construction of harness-mountings, as hereinafter set forth and claimed, and as illustrated in the annexed drawings, in which—

Figure 1 represents the metallic part of a terret as formed before being finished with hard rubber or other equivalent elastic covering material, in connection with polishable exposed parts of the metal, according to my invention; Fig. 2, a view of the finished terret; Figs. 2ª and 2ᵇ, views of similarly-finished terrets of other forms; Fig. 3, a view of the metallic part of a check-hook for single harness before being partly covered with hard-rubber or equivalent finish according to my invention; Fig. 4, a view of the check-hook finished; Fig. 5, a view of a check-hook for double harness before being partly covered with hard-rubber or equivalent finish according to my invention; Fig. 6, a view of the finished check-hook.

Like letters designate corresponding parts in all of the figures.

I will first describe my invention as applied to terrets, Figs. 1 and 2. The body A of the terret has a portion, *a*, of the same extending to any desired proportional part of the whole, formed entirely of metal, and is cast or first roughly formed of little more than full finished size, as shown in Fig. 1, so it may be dressed down and polished to the ultimate size, as seen in Fig. 2. The remaining portion, *b*, of the body is first cast or formed of smaller diameter or thickness than the polishable part *a*, to allow space for applying hard rubber, japan, or other equivalent material around it, and thus make the outer surface of the body hard rubber or other plastic material equal in diameter or size and flush with the adjacent polishable part, as shown at *c*, Fig. 2. Then, after the hard rubber or equivalent plastic material has hardened, the whole body of the terret is finished as one part, with a smooth and even surface, as shown. The base B of the terret is ordinarily of polishable metal, as shown.

Referring now to the single-harness checkhook, Figs. 3 and 4, a similar construction is adopted. Thus here the body A of the checkhook is shown in Fig. 3 as having a portion *a* near the base and a tip portion *a* of the full ultimate size, or a little more, to be finished down and polished with the metal alone, and the middle part, *b*, made of smaller diameter or thickness, to be filled in with hard rubber, japan, or equivalent plastic material, which will subsequently harden and be capable of receiving polish, as shown at *c*, Fig. 4. The whole body is then finished and polished smooth and even as one part. The difference in diameter between the parts *a* and *b* is shown less in Fig. 3 than in Fig. 1.

Referring again to Figs. 5 and 6, representing a double-harness check-hook, parts *a a a* of the body A are first cast or formed of full size to finish and polish in metal, and the remaining portions, *b b*, are cast or made of smaller diameter or thickness to receive hard rubber or equivalent material, so that when finished and polished, as shown at *c c*, Fig. 6, these parts will be even and flush with the metallic polishable parts *a a a*. The base B is also ordinarily made of the polishable metal. When elastic material less firm and cohesive than hard rubber—such as japan—is used, it is applied in thinner layers than the rubber, and consequently the covered part of the metal is made relatively larger in relation to the size of the exposed polishable part of the metal, in order to make the whole outer surface flush, as indicated in Fig. 3. The exposed metallic parts are made of silver, oroide, nickel, or other suitable polishable metal, or may be made of inferior metal plated with gold, silver, or nickel, and then polished.

Not only is this method of construction of the bodies or main parts of the harness-mountings with polishable portions of the metal and the plastic covering portions all flush and even with each other of value in enabling the mountings to be finished and polished more easily and cheaply than with other constructions, and the mountings are elegant in appearance, but there is a decided advantage in the use of the mountings, since the parts with which the reins or straps of the harness come in contact present no projections to chafe and wear the same, and the movements of the parts are made smoothly and noiselessly.

I claim as my invention—

The method of making harness-mountings which consists in first casting or roughly forming metallic bodies for the mountings having portions of full size and other portions of smaller size, then covering the smaller portions with a plastic material substantially even with the larger portions and hardening the same, and finally finishing the metallic and hardened plastic surfaces, substantially as herein specified.

In witness whereof I have hereunto signed my name in the presence of two subscribing witnesses.

ROBERT S. GRUMMON.

Witnesses:
CHAS. F. HERR,
MAURICE DE JONGE.